United States Patent [19]

Heredia de la Paz et al.

[11] 4,446,888

[45] May 8, 1984

[54] SOLENOID ACTUATED VALVE BLOCK FOR GLASSWARE FORMING MACHINES

[75] Inventors: Jorge A. Heredia de la Paz; David F. Sanchez, both of Monterrey, Mexico

[73] Assignee: Vitro-Tec Fideicomiso, Monterrey, Mexico

[21] Appl. No.: 330,920

[22] Filed: Dec. 15, 1981

[51] Int. Cl.³ .............................................. F15B 13/08
[52] U.S. Cl. ................................ 137/596.17; 65/161; 137/625.65; 137/884
[58] Field of Search ................................ 65/161, 163; 137/596.16, 596.17, 625.65, 884; 251/80

[56] References Cited

U.S. PATENT DOCUMENTS

| | | | |
|---|---|---|---|
| 3,254,675 | 6/1966 | Johnson | 251/80 X |
| 3,918,489 | 11/1975 | Foster et al. | 137/596.16 |
| 4,036,256 | 7/1977 | Bublitz et al. | 137/595 |
| 4,082,108 | 4/1978 | Dininio | 137/596.16 X |
| 4,100,937 | 7/1978 | Mallory | 137/596.16 |
| 4,162,910 | 7/1979 | Lining et al. | 65/161 X |
| 4,241,761 | 12/1980 | Miller | 137/884 X |

Primary Examiner—Gerald A. Michalsky
Attorney, Agent, or Firm—Sughrue, Mion, Zinn, Macpeak and Seas

[57] ABSTRACT

A valve block for glassware forming machines is rendered faster and more accurate by substituting, for the pilot air valve system, a plurality of solenoids directly coupled with the cartridge valves, the coupling between said solenoids and said valves comprising a lost motion mechanical memory which, on reception of one pulse by the solenoid, pushes the cartridge valve and forces it to remain open, until reception of the next pulse by said solenoid, when it releases the cartridge valve to be closed; and a compensating spring, which is stronger than the force necessary to open said valves but weaker than the maximum force exerted by said solenoid, between said lost motion mechanical memory and said cartridge valve.

3 Claims, 2 Drawing Figures

SOLENOID ACTUATED VALVE BLOCK FOR GLASSWARE FORMING MACHINES

FIELD OF THE INVENTION

The present invention refers to a solenoid actuated valve block for glassware forming machines which is very compact, efficient and suitable for use in practically any glassware forming machine.

BACKGROUND OF THE INVENTION

As is well known, prior art valve blocks for glassware forming machines were devised to satisfy the control needs of the automatic machines which, working on the blow-blow or the press-blow method, effected sequentially a plurality of operations for the manufacture of glassware. Said valve blocks consisted in a metal block having suitable dimensions to be installed in the machine for the manufacture of glassware and contained a plurality of air valves which were in turn operated by pistons or like elements which, in turn, were operated by means of pilot valves mechanically actuated by the also well known timer drum, which was designed jointly with said machines to automatically and sequentially effect the necessary operations.

The air power system, however, was inefficient by virtue of the fact that the pilot valves actuated by the timer drum were located at considerable distances from the main valve block which fed the operational air to the various units and mechanisms of the machine, and by virtue of the fact that the pilot air is normally handled under low volume and high pressure, in order to act on the pneumatic valves by means of pistons which have to overcome a lower pressure of the operational air which was handled at great volumes and, hence, this caused delays that, while being of some fractions of seconds, nevertheless constituted a serious disadvantage for an accurate operation of said machines, which work in a very fast manner. Therefore, many of the installations of glassware manufacturing machines were provided with timer drums directly installed on or near the main operational valve blocks in order to actuate by means of cams, and in sequence, a series of pushers which mechanically operated the valves of said block so as to have a practically instantaneous response. All the prior art installations, using machines operated on the basis of the timer drum, that is, on the basis of operational mechanical cams, were therefore highly intricate and inefficient, because any wear of the mechanical moving parts or any change in the glassware forming process, caused considerable delays and overrides, which were very substantial from the point of view of the speed of operation of the machines and thus inadmissible, causing frequent stops in the machine to remedy the defects of the mechanically actuated movable elements of the valve block, inasmuch as the adjustment operation was difficult and dangerous for the operator because it was effected manually and with the machines working.

With the advent of electronic controls which replaced the traditional mechanical timing drum for mechanically actuating by means of a plurality of cams and pistons that in turn actuated the valves of the block of a glassware manufacturing machine, the conditions of operation and efficiency of the process were greatly improved, inasmuch as it was then possible to have recourse to the use of solenoid valves actuated by means of electrical signals from the electronic timer control, in order to handle in the adequate sequence the various valves of the block of the machine, whereby the responses were more accurate and the traditional problem of undue wear of the cams of the drum or of the followers for operating the valves of the machine was avoided, whereby the number of stops for repairs and replacements was decreased considerably, which enabled the glassware manufacturing industry to increase the speed of operation of the glassware manufacturing machines operated by said valve blocks.

For instance, in U.S. Pat. No. 4,162,910, patented July 31, 1979 to Ball Corporation, a device of this character is described, in which the plurality of mechanical air valves of the valve block of a glassware manufacturing machine, particularly of the well known I.S. type, were operated by means of a plurality of mechanical pusher pistons, integrated to a pneumatic pilot cylinder, for the reception of pilot air from a corresponding solenoid valve. A solenoid valve was provided for each piston and, consequently for each individual valve of the block and these solenoids were actuated by means of electrical signals derived from the electronic timer control of the machine. The valve block of U.S. Pat. No. 4,162,910, while considerably improving the actuation as compared to the traditional timer drum, had as its sole purpose the substitution of said timer drum by means of a plurality of solenoid valves actuated by an electronic timer control. The principle of providing mechanical pusher pistons for pushing the actuators of the valve block was however preserved, said pistons having been incorporated in an additional block which contained a plurality of operational chambers for the pistons, which were arranged angularly with respect to the air ducts from the solenoid valves, whereby the arrangement was relatively intricate. It was also necessary to attach, to the already existing valve block in the glassware forming machine, an additional block of a considerable size, in which all the chambers for the pistons were contained as well as the tubes for feeding pilot air and for carrying pilot air towards the pistons operated by the solenoid valves which had also to be accommodated in the neighborhood of said block, thus rendering the installation and adaptation of said device to the existing glassware forming machines extremely difficult. As the operation of the valves of the block was still effected by mechanical means, namely, by pushers pneumatically actuated by the pilot air from the solenoid valves in accordance with the above explanation, said pushers had to be necessarily contiguously installed with the valve members of the block and aligned therewith, which caused numerous problems of installation which even led to severe modifications of the machines, whereby said technological advance had not a great acceptance. That is, in the particular instance an additional pusher piston block was necessary, said pistons being actuated by means of solenoids and being installed contiguously to the existing valve block, whereby, while the efficiency of operation was considerably improved with respect to the valve blocks actuated by the timer drum, this device did not solve the problem of providing a valve block which, when used in lieu of the prior art blocks, could be easily adaptable to any glassware forming machine of those existing in the market.

With the advent of the cartridge valve, which in short is a slidable plunger type valve comprising two inner chambers and a plunger, said plunger in a first position thereof communicating the two inner chambers with each other and said plunger in a second position thereof communicating one of said inner chambers with the exterior, the design of the valve blocks could be considerably improved, inasmuch as this type of cartridge valves, appropriately operated by means of pilot air, showed considerable advantages with respect to the mere pistons used in the valve blocks of the prior art, such as that described and claimed in the above mentioned U.S. Pat. No. 4,162,910. Therefore, the operation of the valve blocks for glassware forming machines was rendered more efficient and of more instantaneous response by virtue of the elimination of the purely mechanical operating valves, using instead pneumatical valves which are of faster and more accurate response than said mechanical valves and which, also, do not contain movable parts which may be easily worn out.

Therefore, in U.S. Pat. No. 4,082,108, patented Apr. 4, 1978 to Maul Technology Corporation, a valve block is described which uses the above mentioned cartridge valves, the plungers of which were actuated by means of pilot air controlled through solenoid valves mounted externally of the block, and said block valve of U.S. Pat. No. 4,082,108 was designed in such a way that the valve block contained two separate rows of valves, each of which was provided with chambers within which the cartridge valves operated. Through each row of valves there were associated an operational air feed manifold and an exhaust manifold for operational air, which were handled by the movement of the plungers of the cartridge valves in turn operated by means of the pilot air handled by the solenoid valves external to the valve block, whereby in a position of the plunger of the cartridge valve, the air of the operational air feed manifold towards the operational feed lines to the various parts of the machine, whereas in the other position of the plunger, said operational air lines were communicated with individual exhausts which were connected to the exhaust manifold of the valve block of said patent.

While the valve block of U.S. Pat. No. 4,082,108 considerably improved the efficiency of the valve blocks of the prior art, it still showed serious drawbacks in view of various causes, inter alia, that given the provision of two different manifolds for feeding operational air and two different exhaust manifolds for the operational air, it was necessary to space the two rows of valves of the block by a considerable distance, which increased the size of the block, therefore rendering the same difficult to adapt to the existing machines, whereby certain elements of the machine had to be redesigned to accommodate the said valve block of a larger size in order to integrate the same to a glassware forming multiple station machine.

On the other hand, the provision of pilot air through solenoid valves installed externally of the valve block constituted a considerable disadvantage, in view of the fact that the pilot air lines had to be necessarily long and consequently the response of the cartridge valves to the pneumatic signal sent by the solenoid valves was not as instantaneous as desirable, thereby causing a lag of a number of fractions of a second which, in view of the high speed of these machines, was enough to create the need of dephasing the operation of the machine with respect to the signal in order to compensate for the delay in the signal.

On the other hand, the provision of pilot air control solenoid valves required an externally complex installation and this rendered the installation and the maintenance and operation of said valves more difficult to a considerable extent.

The above mentioned disadvantages of the valve blocks built with cartridge valve chambers were partially overcome by valve blocks in which the solenoid valves were integrally provided in the valve block, whereby the distance of travel of the pilot air was minimized and the resulting signal was practically instantaneous. Thus, for instance, in U.S. Pat. No. 3,918,489, patented Nov. 11, 1975 to Emhart (UK) Limited and equivalent to British Pat. No. 1,415,012 also to Emhart (UK) Limited, a valve block is described which operates with cartridge valves introduced in chambers within the block and having a corresponding plurality of solenoid valves arranged in an additional device integrated to the block, in order to decrease to a considerable extent the distance that the pilot air must move from its source, through the solenoid valve and towards the expansion chamber of the cartridge valve, whereby an instantaneous pilot signal was secured, thereby overcoming the drawbacks shown by the prior art valve blocks, including those described in U.S. Pat. No. 4,082,108, even when the latter was developed after the valve blocks of U.S. Pat. No. 3,918,489. Despite the fact that the valve block of U.S. Pat. No. 3,918,489 is a very compact and practical valve block which satisfactorily solves almost all the problems presented by the prior art blocks, said valve block still shows certain disadvantages, particularly in connection with the arrangement of its elements, in view of the fact that in said valve block it is still necessary to maintain two totally spaced valve rows with an exhaust manifold inbetween and, in connection with the operational air inlets to the cartridge valves, these inlets are normally individual or at most depend from two inner but separate manifolds, which force said blocks to be relatively large. This affected the practicality of the block to be used in lieu of other valve blocks in the majority of glassware forming machines.

As to the pilot solenoid valves which are integrated to the block itself, said valves, in view of a manual piloting device which they must contain, angularly arranged with respect to said solenoid valves, required considerable room whereby the piolt air block had to be very thick, thus increasing the cost of manufacture of the block and rendering its installation in reduced spaces difficult. Also, the pilot air channels had to be necessarily long and consequently wider, which produced a higher air consumption and a deficiency as to the instantaneous characteristic that the pilot signal must have in order to operate the cartridge valve so as to obtain an instantaneous response in the operational air, inasmuch as the various mechanisms of glassware manufacturing machines must be moved at accurate times and with extremely high speeds, thus requiring a considerable accuracy in the pilot signal, which is not obtainable with the design of the valve block of U.S. Pat. No. 3,918,489. The provision of separate operational air inlets, or the provision of an air inlet manifold with two plenums or exhaust manifolds, also caused the volume of the valve block to this patent to be considerable, which together with the considerable size that the pilot air block must have, produced a very bulky and heavy valve block, not adaptable in practice to many existing glassware forming machines. On the other hand, the spacing between the two rows of valves contained by the block of U.S. Pat. No. 3,918,489, rendered it difficult to enclose the solenoid valves within a pressurized chamber to avoid any pollution by dust or fumes and the like, which caused a deficient performance of the solenoid valves with the consequent stops or delays in the machines. The arrangement of the handles for manual actuation of the solenoid valves, at right angles with respect thereto and at a different face of the block, was also a considerable disadvantage. Also, said manual actuating mechanisms were, in the device of the above patent, very cumbersome and inefficient and slow to be handled by the operator, which caused inefficiency situations when the operator was unable to move the actuator with sufficient speed to open or close the solenoid valves at a given time.

All the above mentioned problems shown by the prior art valve blocks have been duly solved by a valve block which is described in copending U.S. patent application Ser. No. 330,919, filed in the name of the same applicants on the same date hereof and clamping priority on Mexican patent application No. 185,294 filed Dec. 16, 1980, which shows a highly improved valve block, acting in a similar manner, that is, under the same basic principles of the valve block of U.S. Pat. No. 3,918,489 (or British Pat. No. 1,415,012) which carries out its functions with a highly increased efficiency and without showing the problems shown by the valve block of the above mentioned patents. In effect, said U.S. copending application mentioned above describes a valve block that is constructed by having two staggered rows of valve chambers within which the respective cartridge valves operate, and said block comprises a block having only one single operational air feed manifold, said manifold having a generally rectangular cross-section and extending along the length of said valve block, whereby the valve chambers open on one side of said manifold directly without the need of intermediate conduits which would cause pressure drops, said chambers opening at their other ends on one outer face of the valve block. Said valve chambers are provided by means of an intermediate block which is attached to the above mentioned block or primary block, wherein said chambers are suitably provided by means of bores that directly open towards the manifold and towards the outer face of the block. Of course, suitable conduits are also provided in this intermediate block to connect each one of said valve chambers with the exterior of the block. A secondary block is also provided directly attached to said intermediate block, on which a plurality of solenoid valves also arranged in a staggered array are provided, with a pair of conduits or manifolds for feeding pilot air running along the secondary block and a plurality of very thin and short conduits for pilot air towards the expulsion chamber of the cartridge valves, said secondary block or pilot air block being thin in order to shorten the length of the path to be travelled by the pilot air. The solenoid valves of said improved block are of very small capacity by virtue of the fact that only an opening signal must be transmitted to the valve in order to feed pilot air into the cartridge valve chamber, and this arrangement provides shorter pilot air paths as well as a smaller air consumption, also securing an instantaneous signal in view of the short distance that the pilot air must travel and in view of the fact that the operational air is directly communicated from the manifold connecting the same to the respective valve chambers which contain the cartridge valves, which provides for a flow of air without any appreciable pressure drop towards the various mechanisms of the machine, each one of which is connected by means of the well known needle valve system with each one of the valve chambers of the block of said invention. The above, besides achieving a practically instantaneous response of the mechanisms with respect to the time in which electrical signals are received through the solenoid valves, also provides a very compact block which is adaptable to any type of glassware manufacturing machine and, also, said block may be manufactured by modification of already existing blocks by means of small adaptations which do not require the exercise of intricate techniques or the use of high labor.

While the block of the above mentioned copending U.S. application totally solves the problems presented by the prior art blocks, it still requires the installation of a pilot air system which, regardless of its efficiency, causes a delay, however small, whereby the signal is not at all instantaneous, and it has been the purpose of the workers in the art to seek a device which, without loosing the safety and accuracy of the pilot air systems, may replace the same with advantages by improving the instantaneous characteristic of the signal Another important drawback of the prior art valve blocks is that two considerable operational effects may occur when the pilot air is dirty, namely, that the dirt may prevent the pilot valve from accomplishing a tight seal which maintains the corresponding mechanism actuated; and that the humidity causes corrosion in the cartridge valves thus considerably reducing the life thereof.

BRIEF SUMMARY OF THE INVENTION

Having in mind the defects of the prior art valve blocks, it is an object of the present invention to provide a solenoid actuated valve block for glassware forming machines which will be very compact and will have all of its elements duly integrated, and which will be susceptible of adaptation, with very few modifications, to the majority of the existing glassware forming machines.

It is one other object of the present invention to provide a valve block of the above mentioned character, which will be of a very simple and compact construction and yet of a high efficiency as to the provision of a practically instantaneous signal.

One other and more particular object of the present invention is to provide a valve block of the above mentioned character, which will be fully actuated by means of solenoids directly coupled to the pneumatic cartridge valves, thus avoiding the necessity of a pilot air system in its entirety.

One other object of the present invention is to provide a valve block of the above mentioned character, which will be extremely compact by not having more than one single air manifold therewithin.

An additional object of the present invention is to provide a valve block of the above mentioned character, in which the cartridge valves can be manually actuated by manually operated devices that are integrally contained in the actuating solenoids and in aligned positions with said valves.

One other object of the present invention is to provide a valve block of the above mentioned nature, in which the pilot air system will be avoided in its entirety in order to secure an absolutely instantaneous signal.

One other and more particular object of the present invention is to provide a valve block of the above mentioned character, in which the valves are actuated by two separate signals for commanding the opening and the closure of the valves.

The foregoing objects and others ancillary thereto are preferably accomplished as follows:

In accordance with a preferred embodiment of the invention, a valve block for glassware forming machines is rendered faster and more accurate by substituting, for the pilot air valve system, a plurality of solenoids directly coupled with the cartridge valves, the coupling between said solenoids and said valves comprising a lost motion mechanical memory which, on reception of one pulse by the solenoid, pushes the cartridge valve and forces it to remain open until reception of the next pulse by said solenoid, when it releases the cartridge valve to be closed; and a compensating spring stronger than the force necessary to open said valves but weaker than the maximum force exerted by said solenoid, between said lost motion mechanical memory and said cartridge valve.

BRIEF DESCRIPTION OF THE DRAWINGS

The novel features that are considered characteristic of the present invention are set forth with particularity in the appended claims. The invention itself, however, both as to its organization and its method of operation, together with additional objects and advantages thereof, will best be understood from the following description of a specific embodiment, when read in connection with the accompanying drawings, in which:

DETAILED DESCRIPTION

Figure 1:
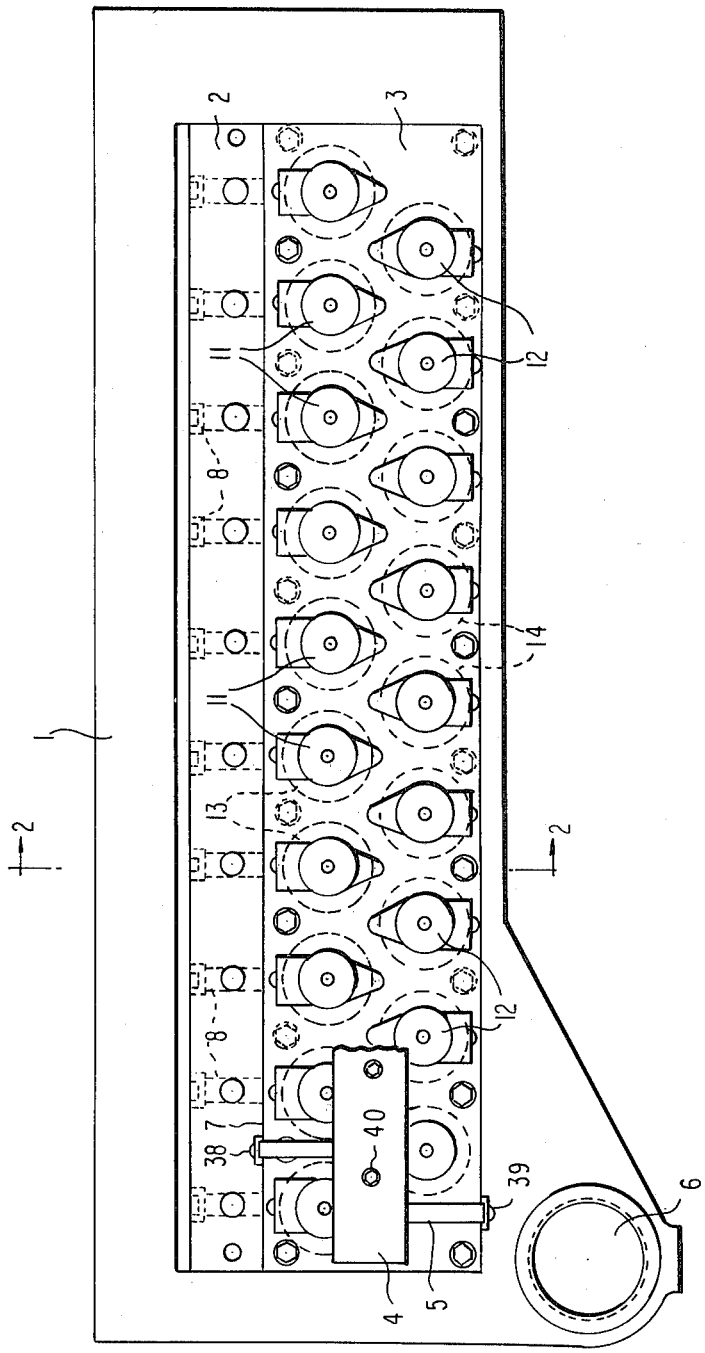
FIG. 1 is a bottom plan view of a valve block built in accordance with the present invention.

Having now more particular reference to the drawings, there is shown a valve block built in accordance with a preferred embodiment of the present invention, which comprises a metal block 1 containing therein, suitably machined, all the necessary channels for communicating each oe of the valves with the operational lines of a glassware manufacturing machine, such as the well known type I.S. machine, to which lower face a block 2 is attached in order to contain the exhausts 8 for the various valves and under which, exposed to the exterior of the lower face of the block, there is attached a pilot valve plate 3 wherein all the mechanisms for providing the pilot signals to the cartridge valves are provided, as will be described in more detail hereinbelow. The solenoid valves are attached on said pilot plate 3, by means of a fastening plate 4 which extends throughout the block but which, as may be clearly understood by any expert in the art, may be modified to provide the support of the solenoid valves by mere belts or any other fastening device. The plate 4 is attached to the side edges of the block 2 by means of suitable bolts 5 and 7, which bolts are attached at one of their ends to the plate 4 and at the other ends to the block 2 by means of suitable hinges and/or buckles 38 and 39. Block 1 has, at its lower left corner as shown in FIG. 1 of the drawings, a projection in which a passage 6 is provided, in order to serve as the main inlet for operational air to the operational air feeding manifold 9 which will be described in more detail hereinbelow. Also fastened to the pilot plate 3 is a plurality of solenoid valves arranged in two parallel series 11 and 12, directly above the open mouths of the respective valve chambers 13 and 14 as shown in FIG. 1 of the drawings, said valves being distributed in a staggered fashion in the two rows 11 and 12 in order to keep the space requirements of the block down to a minimum. These solenoid valves 11 and 12 receive electrical signals through suitable cables such as 41 (FIG. 2), in order to operate the cartridge valves provided within the chambers 13 and 14.

The intermediate block 2 contains a plurality of bores 8 which function as exhaust ducts for the valve chambers which will be described hereinbelow, all of which may be connected to a manifold integrated to the valve block and which is not shown for clarity of illustration of the invention, but which may be attached under the plate 3 in order to constitute a general air exhaust which receives the individual exhausts of the ducts 8 of block 2 as will be easily understood by any one skilled in the art.

Figure 2:
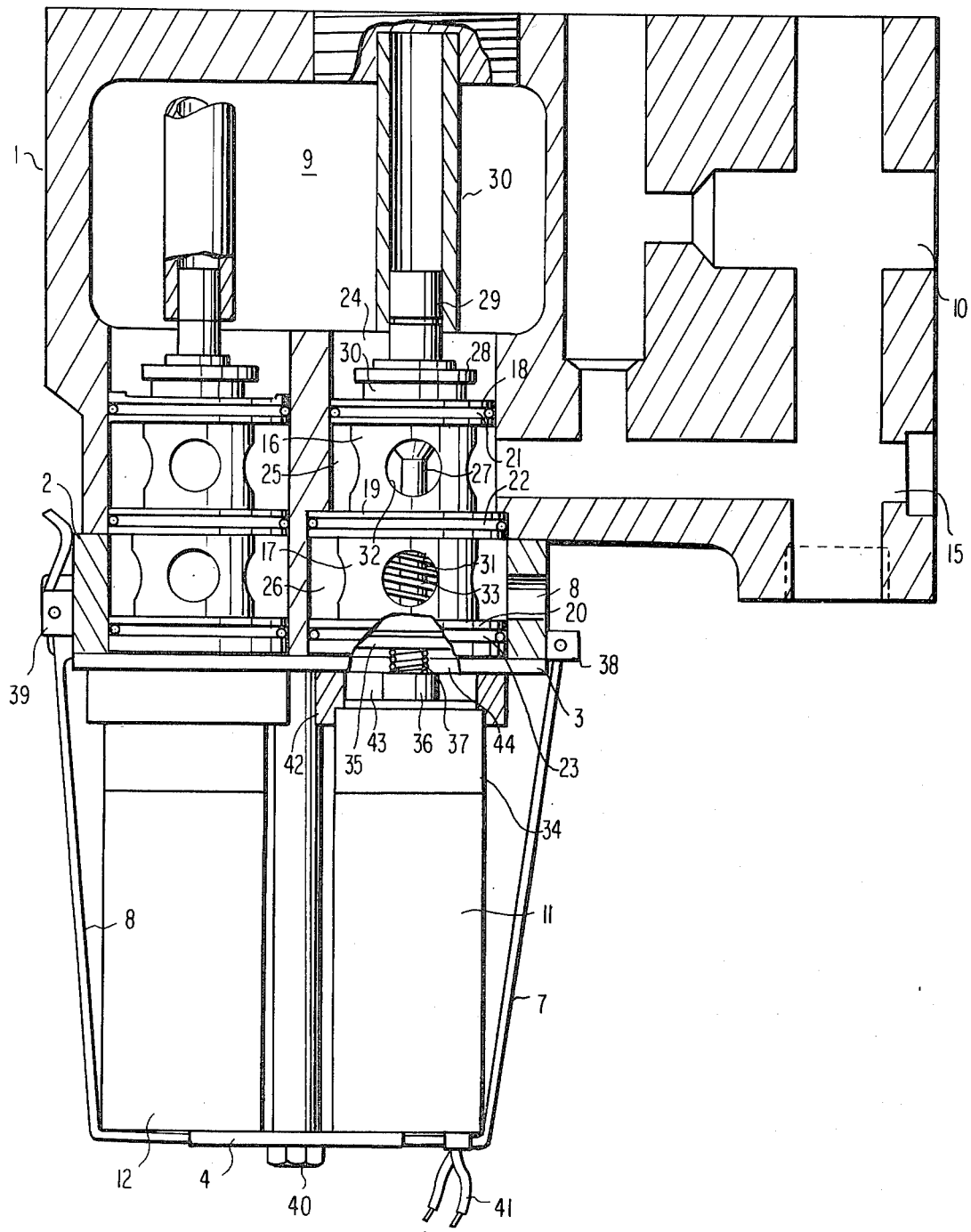
FIG. 2 is a cross-sectional elevational view taken along lines 2—2 of FIG. 1 and looking in the direction of the arrows, to show the arrangement of the cartridge valves and their interrelation with the solenoids.

As may be clearly seen in more detail in FIG. 2 of the drawings, block 1 contains throughout the length thereof a preferably rectangular duct indicated by means of the reference numeral 9, communicating by means of a suitable duct with the main inlet 6 for operational air, in order to feed air to the chambers 13 of cartridge valves which are of a well known type. Within said block 1, a series of outlet ducts for operational air are provided, in order to feed air, at the times controlled by the timer of the machine, to the various mechanisms of the glassware making machine, said ducts being illustrated by means of reference numeral 10 with the secondary ducts 15 to constitute a pneumatic control system with retention needle valves as is well known in the art, whereby it is not considered necessary to describe this system in more detail.

The solenoid valves 11 and 12, as shown in FIGS. 1 and 2 of the drawings, are arranged under the plate 3 in two parallel rows, each valve 11 being arranged between each pair of valves 12 and viceversa, whereby a staggered arrangement of the valves is provided with the two lines 11 and 12 of valves, which as mentioned above, minimizes the space requirements of the valve chambers, whereby the block built in accordance with the present invention is extremely compact and easily adaptable to any existing glassware manufacturing machine.

As more clearly shown in FIG. 2 of the drawings, the solenoid valves 11 and 12 are respectively aligned with chambers 13 and 14, within which chambers suitable well known type cartridge valves are arranged in order to handle the operational air fed through the feed manifold 9 and entering into chambers 13 and 14, in order to be handled by the cartridge valves through the respective operational air outlets 10, 15, and towards the operational air exhausts 8 to the exterior of the block.

Each chamber 13 or 14 of the block has incorporated a cartridge valve as clearly shown in FIG. 2 of the drawings, which essentially comprises a narrower cylindrical body 16 and a thicker cylindrical body 17, collinearly arranged to each other and from which annular flanges 18, 19 and 20 project outwardly, with flange 18 being located at the end of the valve which is adjacent to the operational air feed manifold 9, the intermediate flange 19 dividing the two bodies 16 and 17 of the valve and the outer flange 20 being contiguous to the pilot plate 3, thus dividing the chamber 13 (or 14) into an inner chamber 24 communicating directly with manifold 9, a chamber 25 communicating with the feed ducts for operational air towards the machine as indicated by means of the reference numeral 15, and a chamber 26 which communicates with the operational air exhaust ducts 8, and is closed at the end of the valve by means of a pusher plate 35 which performance will be described hereinbelow. Also, a contiguous hollow chamber 43 is provided within a sleeve 42, to accommodate the actuation mechanism operated by the solenoids 11 and 12, and a plurality of openings 44 in plate 3 permit the extension of the operating mechanism between the cartridge valves and the solenoids.

In order to tightly isolate each one of the chambers 24, 25, 26 and 43, into which each valve chamber 13 is divided, the flanges 18, 19 and 20 have respective circumferential edge channels within which O-ring packings 21, 22 and 23 are arranged, respectively, in order to perfectly seal each one of said chambers to avoid communication between said chambers directly around the flanges 18, 19 and 20.

As is well known, the cartridge valves contain a shank 27 which is axially movable within the valve and more particularly is pushed upwardly as seen in FIG. 2 of the drawings, by any suitable means, and which shank 27 is returned to its original position by means of a suitable helical spring 31, also shown in FIG. 2 of the drawings. The shank 27 has a pair of plugs, one of which, namely, plug 30, partially shown in FIG. 2 of the drawings, plugs an opening provided centrally of flange 18, and another plug between chambers 25 and 26, that is coincident with an opening provided centrally of the flange 19.

The body of the cartridge valve has a plurality of radial openings 32 to communicate the interior of the valve with the chamber 25, and similarly the body 17 has a plurality of radial openings 33 communicating the inner portion of the valve with chamber 26, for a purpose which will be clearly seen hereinbelow.

The cartridge valve has an extereme plate 28 to which an end guiding shank 29 is attached, said guiding shank being guided by means of a cylinder or tube 30 arranged collinearly of the cartridge valve and supported on the upper wall of the block 1, and said tube extending across the space provided by the operational air manifold 9.

The other end of each cartridge valve, as described above, is provided with a pusher plate 35, which in turn is actuated by means of a compensator spring 37 which function will be described in more detail hereinbelow, said compensating spring 37 bearing at one of its ends against said pusher plate 35 and, at the other of its ends, against a bolt 36 actuated by the solenoid 11 as shown in FIG. 2 of the drawings. Each solenoid valve 11 and 12 contains a mechanical memory or lost motion pushing device 34, of a well known type, which functions much in the same way as the lost motion mechanisms of the well known ball pens. The compensating spring 37 must be of a strength larger than the strength of the spring 31 plus the pressure of the air in the manifold 9, in order to be able to push the cartridge valve, but must be of a strength lower than the strength of the solenoid 11, in order that it may yield when the bolt 36 pushes the same against the plate 35 for a purpose which will be clearly seen in the explanation that follows.

The valve block of the present invention therefore, operates under the control of solenoids which, on receiving a first electrical signal, will push the shank 27 of the cartridge valve upwardly as seen in FIG. 2 of the drawings, thereby communicating chamber 24 with chamber 25, whereby operational air may pass from the manifold 9 into chamber 24, through the intermediate unplugged opening of flange 18, through the openings 32 of the body 16 into chamber 25 and hence to the duct system 10, 15 for being fed to the various mechanisms of the glassware forming machine. On a second electrical signal, the solenoid valve again actuates and through the bolt 36 again pushes the spring 37 which, in this particular instance, yields without pushing the shank 27. Thereafter the bolt 36 releases the spring 37 in order to allow the shank 27 to be pushed by means of the spring 31 backwardly into the position shown in FIG. 2 of the drawings, whereby the opening of the flange 18 is plugged whereas the opening of the flange 19 is opened, thus communicating the duct system 10, 15 through chamber 25, through openings 32 into the body of the valve, through the opening of flange 19 and through openings 31 of the body 17 into chamber 26 and hence towards the exhaust ducts 8 in order to allow the escape of operational air from the selected mechanism of the glassware forming machine which, at this time, ceases to operate.

The lost motion mechanism 34, therefore, firstly pushes to bolt 36 leaving the valve open for the admission of operational air, whereas upon receiving the second signal, again pushes but releases automatically the valve, as is will known for this type of mechanisms.

The compensating spring 37 is necessary because said mechanical memories 34 of well known type, have a lost motion of about 0.5 inches, which must be compensated for, whereby the spring must yield against the push of the bolt 36, but must not yield against the push of the spring 31 and the pressure of the air in manifold 9, in order to maintain the valve open for the admission of air, at the first actuating signal of the solenoid of the present invention.

The pulses for actuating the solenoids must ideally be square waves of a typical duration of 100 milliseconds, thereby generating a duty cycle of about 3.3% at the rate of 20 gobs per minute and per section of the glassware forming machine. This will permit a continuous operation without the need of any forced cooling of the solenoids.

Thus, a very accurate device has been provided in a valve block for glassware forming machines, because both the admission of operational air and the exhaustion thereof are provided by separate and individual electrical signals fed to the solenoids through cables 41, whereby the timing of the actuation of the various mechanisms of a glassware manufacturing machine may be rendered extremely accurate and, also, does not require the energization of the solenoid valves for the whole time which the air must be admitted, as was necessary with old prior art valve blocks actuated by means of solenoids.

The compensating mechanism connected between the lost motion mechanism 34 of the solenoid 11 and the pusher plate 35, within a chamber 43 provided by the sleeve 42 which serves as a connector between the solenoid valves as mentioned above, may be fastened and pressed against the sleeve 42 by any suitable means, such as the belt system shown in FIG. 2 of the drawings and described above, but it must be understood that said fastening mechanism may be of any other nature without departing from the true scope and spirit of the instant application.

Although a specific embodiment of the present invention has been shown and described above, it is to be understood that many modifications thereof are possible. The present invention, therefore, is not to be restricted except insofar as is necessitated by the prior art and by the spirit of the appended claims.

We claim:

1. A solenoid actuated valve block for glassware forming machines, which comprises a primary block provided with an inner longitudinal operational air manifold, a plurality of valve chambers opening towards a lower surface of said block at one of their ends and towards the operational air manifold at the other end thereof, a plurality of cartridge valves arranged within said valve chambers, each chamber having a duct for operational air individually connected with a pneumatic operational line of the machine and an exhaust duct opening to the atmosphere, a plate attached to said lower surface of the block, said plate having a plurality of openings coincident with each of said valve chambers of the block, a plurality of solenoids mounted on said plate and directly coupled with the cartridge valves, the coupling between said solenoids and said cartridge valves comprising a lost motion mechanical memory which, on reception of one pulse by the solenoid, pushes the cartridge valve and forces it to remain open for the admission of operational air, until reception of the next pulse by said solenoid, when it releases the cartridge valve to be closed and permits the operational air to be exhausted, and a compensating spring, one end of which bears against said cartridge valve and the other end of which bears against said lost motion mechanical memory, said compensating spring being stronger than the force necessary to open said valve but weaker than the maximum force exerted by said solenoid, in order to permit compensation of the lost motion of said mechanical memory for opening and closing the valve.

2. A valve block according to claim 1 wherein said lost motion mechanical memory is directly actuated by said solenoid and said compensating spring is attached thereto at one of its ends by means of a pushing bolt operated by said lost motion mechanical memory, the other end of said compensating spring bearing against a pusher plate which is directly attached to an operating shank of each cartridge valve.

3. A valve block according to claim 2 wherein each one of said cartridge valves arranged within said valve chambers in the block is provided with a guiding shank in order to secure linear displacement thereof, said guiding shank being in turn guided by a tube collinearly arranged to each one of said valves, said guiding tube being arranged vertically and crossing said operational air feed manifold of the block and being fixed on an upper face of said block by means of suitable fasteners.

* * * * *